Figure 1:
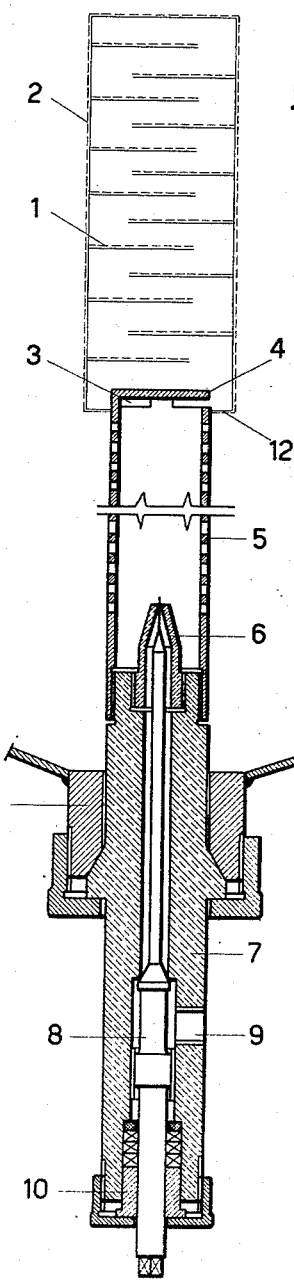

INVENTORS
M. Muench
G. Messina
BY
ATTYS.

United States Patent Office 2,798,794
Patented July 9, 1957

2,798,794

DEVICE FOR CARRYING OUT OXIDATIONS WITH GASES CONTAINING OXYGEN IN LIQUID PHASE

Werner Muench, Cesano Maderno, and Giuseppe Messina, Limbiate, Italy, assignors to Perfogit Società per Azioni, Milan, Italy Application March 1, 1955, Serial No. 491,336

Claims priority, application Italy October 19, 1954

2 Claims. (Cl. 23—252)

The most part of oxidations in liquid phase with gases containing oxygen, viz. almost always with air, are carried out at elevated temperatures, in general with the use of a slight pressure, in a closed apparatus.

To utilize the oxygen introduced to the most complete extent possible, namely to avoid waste of gases, it is necessary to subdivide the gas very finely in the reaction mixture. Whenever the oxidation does not produce crystallized solid compounds, it is possible to subdivide the gas finely enough by means of spinneret-like nozzles.

Such nozzles, however, cannot be used when the oxidation produces crystallized solid compound, because their narrow outlet orifices become clogged after a short time owing to the formation of crystals.

If a lieu of the spinneret-like nozzles, gauzes or fibre-glass webs are used, these too become clogged.

Clogging in these cases is probably due to the fact that the liquid to be oxidized evaporates at the point at which the oxidizing gas is introduced, so that the solid parts, which were in solution previously, crystallize there. This clogging can be avoided by working with a gas feed pipe having comparatively very large dimensions and by distributing then the gas in the liquid by means of an agitator placed above the pipe; in this way, however, there is the disadvantage of having to provide an agitator. Moreover, the tightness of the stuffing boxes of the agitator easily becomes insufficient.

Another device that may be used if the entering gas is under pressure, consists e. g. of a plate of a certain size, movable vertically in an annular body, which provides sealing on its edge by its own weight. The gas is let off into the liquid from the edge of the plate. In this case if clogging occurs, the gradually increasing difference between the pressure of the entering gas and the pressure in the vessel where the oxidation takes place, can move the plate, thus breaking the crystal crusts. In this case however it is very difficult to subdivide the entering gas with the sufficient fineness.

It has been found now that all these inconveniences can be avoided by using the device which we are going to describe. This device provides an outlet for air, or for the gas containing oxygen, without subdividing it and at high speed, from a comparatively large spinneret-like nozzle into a mixing chamber which is at contact with the surrounding liquid. The mixture with the liquid to be oxidized and, therefore, the subdivision of the gas in the liquid, is effected only in one or more tubular members arranged above the nozzle, which serve as mixing chambers.

The entire device is attached to the oxidation vessel below the liquid level. The mixing chambers should be built in such a manner that on the one hand the surrounding liquid can enter and leave freely in and from said chambers, and that on the other, the gaseous currents are established in one single direction in such a way that it becomes possible to subdivide the gas continuously, to bring it back to get mixed with the liquid again and to extend its path through the latter by means of suitable baffles, sieves or like devices. In any case, the entire structure has to be held in such a way that the most part of the gaseous current leaves the mixing chambers only after having mixed intimately with the liquid and after the subdivision of the gas having become sufficiently fine.

In order to extend the path of the gas within the liquid as much as possible, several mixing chambers may be superimposed to one another; and correspondingly, more sieves, baffles or like devices may be provided for changing the direction of gas flow and bringing about better mixing of the gas with the liquid and better distribution of the former in the latter. The liquid should flow continuously from the oxidation vessel to the mixing chamber, and vice versa.

In the accompanying drawing there is illustrated by way of example one typical embodiment of the device. Fig. 1 represents the whole device. It comprises a nozzle applied on the bottom of the reaction vessel which serves for the introduction of air, and the mixing chambers arranged thereabove, of which the first and the second one are represented in Figure 1.

Figure 3:
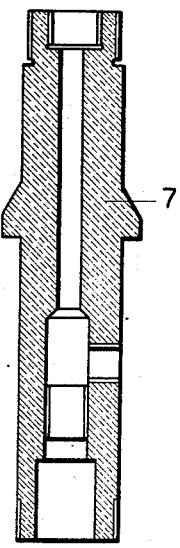

The nozzle comprises a thick-walled metal pipe which is illustrated apart also in Fig. 3.

The annular thickening 7 serves to fix the nozzle on the bottom of the oxidation vessel 11. The portion below the ring, therefore, is outside the oxidation vessel. This vessel carries at its side an aperture 9, into which there is screwed the pipe for introducing the gas. 8 is a stopper of convenient construction, which is fixed in the nozzle by means of a stuffing box 10. This stopper has two functions: first, the liquid is prevented from returning into the gas piping from the aperture of the nozzle when no gas enters; moreover, in moving the stopper it is possible to eliminate any clogging of the aperture, as might occur if gas arrival is stopped for a short time.

Figure 2:
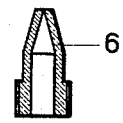

During operation, the needle, which in the drawing is shown in its position inside the orifice of the nozzle, is retracted into the pipe, thus permitting the gas to flow freely through said orifice. The end portion of the nozzle 6 is illustrated apart in Fig. 2. This member is built in such a way as to be easily replaceable; thus, it is possible to vary the aperture of the nozzle as may be needed, merely by interchanging said member. In this way, it is also possible to vary the delivery rates of the gas without changing the pressure. Above the nozzle there are provided the mixing chambers. In Fig. 1, 5 represents a metal cylinder perforated in its lower portion as well as in its upper portion, but not perforated in its central portion, which is for the most part broken off in the drawing. A plate 4 closes this cylinder in such a way that the gas can leave from a slot 3. The liquid entering from the perforated spots of the cylinder is sucked upwards by the air leaving the nozzle. At the point at which the air, which after leaving the nozzle expands in the approximative shape of a cone, has its greatest expansion, the perforations of the cylinder are interrupted, so that no air bubbles can pass there. At that point a good mixing of the gas with the liquid has already taken place. Experience has shown that above the non-perforated portion of the cylinder so little gas is left that perforations for the exchange of liquid can again be provided there.

The length and diameter of this cylinder depend on the diameter of the aperture of the nozzle as well as on the difference of pressure between the entering gas and the pressure in the oxidizing vessel; however, the amount of gas and the pressure may be varied within wide limits, without altering the dimensions of the cylinder at the top and without diminishing the effectiveness of the device. By way of illustration some actual dimensions are tabulated hereinafter however they may be varied within very wide limits.

| Diameter of nozzle hole, mm. | Pressure below the nozzle, atm. | Amount of gas, l., l./h. | Diameter of cylinder, mm. | Length of cylinder, mm. | Length of lower perforated portion, mm. | Length of non-perforated portion, mm. | Length of upper perforated portion, mm. |
|---|---|---|---|---|---|---|---|
| 1 | 0.2 | 500/750 | 21 | 260 | 70 | 70 | 120 |
| 1.5 | 0.2 | 750/1,000 | 21 | 260 | 70 | 70 | 120 |
| 2 | 0.2 | 1,900/2,000 | 35 | 275 | 95 | 65 | 115 |

The device as hereinbefore described is very effective in mixing and, if needed, emulsifying gas and liquid, without any addition. However, above said first mixing chamber, a second one may be installed, to further improve the utilization of the oxygen. This second mixing chamber comprises a cylinder 2, which is of perforated metal sheet or of metallic gauze with about 10 meshes per square cm., or like material. Inside this cylinder, there are provided plates or sieves 1, positioned horizontally or at a small angle upwards or downwards to the horizontal. It has been found that the best thing is to provide the sieves horizontally or at a small angle upwards. The gas leaving the slot 3 arrives at these sieves, passes to a small extent through the meshes, distributing finely and so subdivided it then flows mostly upwards to the end of the sieve.

In this way the liquid and gas become mixed and subdivided further. This cylinder too should permit a possibly free exchange between the internal and the external liquid.

The part 12 of this cylinder may be dispensed with, and the cylinder may so remain open at that place. If wanted, above the sieved cylinder illustrated in the drawing, one or more further cylinders built in the same way or similarly and having equal or conveniently larger diameter may be provided.

However, the utilization of the oxygen in the apparatus described is already so good as to make the installation of further distributing cylinder superfluous. The device described represents only one embodiment; on the same principles, it is possible to modify each of the members described, in one or the other form. The important thing is that the air, or the gas containing oxygen, may be able to enter into the liquid to be oxidized through a comparatively large aperture and preferably at high speed, without needing any device for further subdivision. The mixing of the gas with the liquid and its subdivision therein by means of the devices conveniently accommodated, takes place only after the gas has entered into the liquid. In an oxidation vessel there may be mounted a plurality of devices of the kind described, according to the size of the vessel, so as to increase the output of a given apparatus.

The device described proves useful e. g. in the oxidation of xylene in liquid phase with air, wherewith the oxygen of air can be utilized to an extent of up to 90% and more.

Even if working with a continuous process, over a number of weeks, no clogging from toluic acid in the nozzle hole occurred. It proves useful also in the oxidation of cyclohexylbenzene to obtain cyclohexylbenzene peroxide in aqueous emulsion, wherein the current of air, besides oxidizing, favours the stability of the emulsion. Of course the device may be utilized in any other similar reaction, besides those mentioned above by way of example.

What we claim is:

1. A device for carrying out oxidation reactions in liquid phase, by means of oxidizing gases, comprising, in combination with a container for the liquid to be oxidized, a nozzle for introducing the oxidizing gas into said container, and a mixing chamber positioned in said container and circumscribing the outlet of said nozzle, said mixing chamber consisting of a vertically extending tubular member provided at the top with a closure plate leaving an orifice for the outlet of the non-reacted gas, the outlet of said nozzle being positioned within said tubular member at the bottom thereof, and said tubular member being provided with two sets of perforations for the free passage of the liquid to be oxidized, the first set being immediately above the outlet of said nozzle and the second set being at the top of said member, said member being unperforated between said two sets.

2. A device for carrying out oxidation reactions in liquid phase, by means of oxidizing gases, comprising, in combination with a container for the liquid to be oxidized, a nozzle for introducing the oxidizing gas into said container, a first mixing chamber positioned in said container and circumscribing the outlet of said nozzle, said first mixing chamber consisting of a vertically extending tubular member provided at the top with a closure plate leaving an orifice for the outlet of the non-reacted gas, the outlet of said nozzle being positioned within said tubular member at the bottom thereof, and said tubular member being provided with two sets of perforations for the free passage of the liquid to be oxidized, the first set being immediately above the outlet of said nozzle and the second set being at the top of said member, said member being unperforated between said two sets, and at least one further mixing chamber positioned above said first mixing chamber comprising a perforated wall and a plurality of perforated sheets located internally of said further mixing chamber and arranged at an angle of approximately 90° to the direction of flow of the oxidizing gas.

References Cited in the file of this patent

UNITED STATES PATENTS

| 1,404,701 | Pfisterer | Jan. 24, 1922 |
| 1,763,845 | Edgerton | June 17, 1930 |
| 2,060,557 | Davis | Nov. 10, 1936 |

FOREIGN PATENTS

| 405,178 | Great Britain | Feb. 1, 1934 |